United States Patent [19]
Sippel

[11] Patent Number: 5,975,613
[45] Date of Patent: Nov. 2, 1999

[54] STROLLER SHADING DEVICE

[76] Inventor: Melanie A. Sippel, 110 Gershwin Ct., Wheaton, Ill. 60187

[21] Appl. No.: 09/113,286

[22] Filed: Jul. 10, 1998

[51] Int. Cl.⁶ ...................................................... B60J 9/00
[52] U.S. Cl. ...................................... 296/77.1; 297/184.13
[58] Field of Search ................................. 296/77.1, 136; 297/184.13; 150/166

[56] References Cited

U.S. PATENT DOCUMENTS

| | | |
|---|---|---|
| 561,749 | 6/1896 | Wright et al. . |
| 645,773 | 3/1900 | Wolfgang . |
| 1,289,965 | 12/1918 | Tichenor . |
| 1,770,841 | 7/1930 | Clyman . |
| 2,789,863 | 4/1957 | Shimabukuro . |
| 3,834,756 | 9/1974 | Grell . |
| 4,013,315 | 3/1977 | West . |
| 4,533,170 | 8/1985 | Banks et al. ............................ 296/77.1 |
| 4,773,694 | 9/1988 | Gerber . |
| 5,184,865 | 2/1993 | Mohtasham et al. . |
| 5,542,732 | 8/1996 | Pollman . |
| 5,758,889 | 6/1998 | Ledakis . |

FOREIGN PATENT DOCUMENTS

| | | |
|---|---|---|
| 1198028 | 12/1985 | Canada . |
| 2906125 | 8/1980 | Germany . |

*Primary Examiner*—Joseph D. Pape
*Attorney, Agent, or Firm*—Richard C. Litman

[57] ABSTRACT

A shading device is disclosed for a canopied stroller. The shading device includes a top panel, two side flaps, and a front flap, all of which are made of heavy cotton or cotton blend fabric. The shading device includes front and rear canopy straps to secure the shading device to the stroller canopy. The canopy straps and the side and front flaps may be secured by hook and loop fastener in a variety of configurations to protect a child in the stroller from the sun. A pair of side straps may be included to secure the side flaps to the stroller or to each other.

12 Claims, 4 Drawing Sheets

STROLLER SHADING DEVICE

BACKGROUND OF THE INVENTION

1. Field of the Invention

The present invention relates to stroller accessories generally, and specifically to a shading device for a canopied stroller.

2. Description of the Related Art

Caregivers are frequently concerned about protecting babies and small children from the sun. Sun exposure is a particular problem for children in strollers. Strollers are generally used outdoors, therefore exposing the child to the sun. Children generally are irritated by the sun, especially having the sun in their eyes, and often protest. A child in a stroller is usually strapped in so that his movement is limited. This can lead to sunburn of parts of the child's body exposed to the sun. Sunburn and sun exposure also place a child at risk for skin cancer.

Most strollers include a sunshade or canopy. Typically the canopy is fabric secured to a rigid framework. Some strollers have a sunshade which can be collapsed out of the way when not in use. Some collapsible sunshades can be extended far enough to provide a quiet, dark area for a child to nap in, as well as for sun protection.

The collapsible type of sunshade has disadvantages. It is bulky, expensive, and difficult to fold compactly. In particular, it generally does not fold from side to side, but only forward and backward. The collapsible sunshade adjusts only forward and backward. If the sunshade is lowered for sun protection from one direction, the child's view in other directions is blocked. Collapsible sunshades have particular difficulty in protecting against sunlight coming from directly ahead. The child's feet and legs often cannot be protected from the sun without blocking the child's view of the outside world entirely. Collapsible sunshades are generally included only on expensive strollers which are not intended to fold compactly.

In inexpensive strollers, a rectangular fabric canopy supported on a rigid framework is often provided. The canopy typically pivots out of the way when it is not needed. The canopy is compact and can be designed to fold both front to back and side to side relatively easily. The canopy generally offers only limited sun protection. The canopy typically can be no wider than the width of the stroller. The canopy length is limited by the need to pivot out of the way. Some canopies have a flap hanging from each side of the framework. This improves the sun protection somewhat. However, the side flaps generally cannot be secured out of the way. To avoid blocking the child's view, only short side flaps are used. Even with a side flap, the child has little protection from sun coming from the side of the stroller. The stroller canopy provides virtually no protection from sunlight coming from directly ahead.

A stroller canopy can be supplemented by draping a blanket over the canopy framework in the direction from which the sun is shining. This provides more shade. Unfortunately the typical canopy provides nothing to secure a blanket to. The blanket tends to shift and frequently comes loose. The blanket may become entangled in the stroller wheels, fall off and/or get dirty. If the weather is windy, the blanket tends to blow off the canopy. Since the blanket is not secured, the child in the stroller may also pull it off. The blanket must therefore be rearranged often. The blanket must also be rearranged whenever the angle of the sun changes, such as whenever a corner is turned. If the sun is coming from the front or corners are being turned frequently, two or even three blankets may be required for adequate sun protection. The result is that the caregiver may spend a great deal of time rearranging blankets. The blankets cannot be left on the stroller when not in use, so that the blankets take up space in a diaper bag.

U.S. Pat. No. 5,542,732 by Pollman discloses a shade for a canopied stroller having a fabric shading panel. The fabric shading panel is composed of a material which allows only part of the ambient ultraviolet radiation to pass through. The shade is secured at one end to a forward child restraining member and extends beneath the seat of the stroller. The shade then extends up the rear of the stroller, overlays the stroller canopy, and is attached again to the child restraining member in the front. The shade includes no rigid structural members. The shade includes small screen-like openings over the entire panel to allow for air ventilation. The shade is attached to the stroller by elastic straps and is held closed by hook and loop fastener. The fabric shading panel may be arranged to close partially by attaching it by hook and loop fastener to the body of the shade at the top of the canopy.

The shade disclosed by Pollman has a number of disadvantages. The shade does not extend below the level of the seat of the stroller. The shade therefore offers no protection for a child's feet and legs. The over-and-under attachment to the stroller is complex and time-consuming to install and remove. Due to the over-and-under design, the shade is difficult to adapt to different stroller sizes and designs. The shade does not have separate front and side flaps and can be used only in a relatively small number of possible configurations. The shade is designed to be transparent and cannot be used for a dark enclosure for napping. The ultraviolet screening material is expensive. The design requires a considerable amount of material and is relatively complex to manufacture. The shade is therefore costly.

U.S. Pat. No. 2,789,863 by Shimabukuro discloses a baby stroller protector for protecting against wind and rain. The protector is made from a transparent plastic sheet. The sheet is suspended from the awning of a baby stroller and tied on. A fabric protector having separate side and front flaps is not disclosed. The protector provides no sun protection and is unsuitable for use in sun.

U.S. Pat. No. 3,834,756 by Grell discloses a raincover for a canopied stroller. The raincover is made of polyethylene. The polyethylene may be entirely transparent, or may be opaque and have transparent windows for the child to look out. The raincover is secured to the stroller by snap fasteners. The side walls are attached to the side edges of the top wall by zippers. The raincover can be used in only a relatively small number of possible configurations.

None of the above inventions and patents, taken either singularly or in combination, is seen to describe the instant invention as claimed. Thus a stroller shading device solving the aforementioned problems is desired.

SUMMARY OF THE INVENTION

The present invention is a shading device for a canopied stroller. The shading device includes a top panel, two side flaps, and a front flap, all of which are made of heavy cotton or cotton blend fabric. The shading device also includes four canopy straps to secure the shading device to the stroller canopy. The canopy straps and the side and front flaps may be secured by hook and loop fastener in a variety of configurations. A pair of side straps may be included to secure the side flaps to the stroller or to each other.

Accordingly, it is a principal object of the invention to provide a shading device of fabric having separate side and front flaps which can provide sun protection to the entire body of a child in the stroller, can be individually raised and lowered as needed and secured by hook and loop fastener in a variety of configurations, without blocking a child's view in all directions.

It is a further object of the invention to provide a shading device which overlays and attaches to a stroller canopy by a set of front and rear canopy straps, can be used with many different stroller sizes and designs, and cannot be blown off by wind or pulled off by a child in the stroller.

It is another object of the invention to provide a shading device for a stroller having side straps which can be secured together beneath the stroller seat.

Another object of the invention is to provide a shading device which can be used with inexpensive strollers, can be folded and stored with the stroller, and eliminates the need to supplement a canopy by draping blankets.

Another object of the invention is to provide a shading device for a stroller which provides a dark, stimulus-free enclosure for napping or other quiet activities.

Still another object of the invention is to provide a shading device for a stroller having a rain panel of plastic sheet for partial protection against rain.

Another object of the invention is to provide a shading device for a stroller which is easily attached to and removed from the stroller and is simple and inexpensive to manufacture.

It is an object of the invention to provide improved elements and arrangements thereof for the purposes described which is dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a shading device for a canopied stroller. The shading device includes a top panel, two side flaps, and a front flap, all of which are composed of fabric. Preferably the fabric is composed at least partially of cotton. Most preferably the fabric is a heavy cotton or cotton blend fabric. Preferably the fabric has a dark color.

Figure 1:
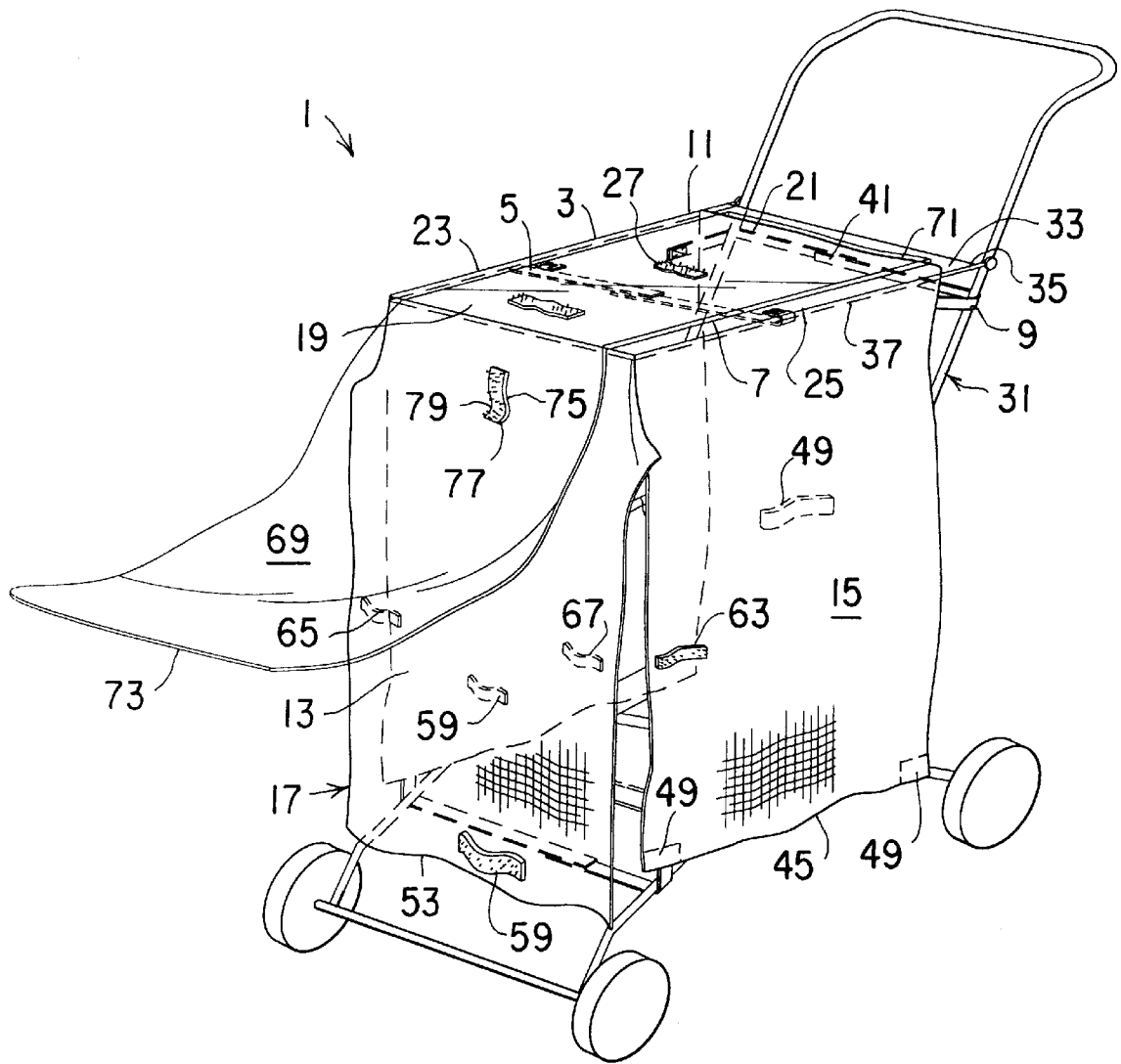
FIG. 1 is an environmental, perspective view of a stroller shading device according to the present invention, with side and front flaps in the lowered position.

FIG. 1 is an environmental, perspective view of a stroller shading device 1. The stroller shading device 1 includes a top panel 3, at least four canopy straps 5, 7, 9, and 11, a first side flap 13, a second side flap 15, and a front flap 17.

The top panel 3 is composed of fabric. The top panel 3 is generally rectangular and has an interior surface and an opposing exterior surface. The top panel 3 has a front end 19, a rear end 21, and a length from the front end 19 to the rear end 21. The top panel 3 has a first side edge 23, a second side edge 25, and a width from the first side edge 23 to the second side edge 25. The top panel 3 has at least two top fasteners 27 and 29. Each top fastener 27 and 29 is composed of a portion of hook and loop fastener. Each top fastener 27 and 29 is attached to the exterior surface of the top panel 3. Preferably the top fasteners 27 and 29 are attached by stitching.

The stroller 31 has at least three wheels and a canopy 33. The canopy 33 is supported on a rigid framework consisting of two rods 35 pivotally attached to the stroller 31. The canopy 33 has a length and a width. The length and width of the top panel 3 approximately correspond to the length and width of the canopy 33. Preferably the length and width of the top panel are about 13 inches and about 18 inches, respectively. The top panel 3 is supported by the canopy 33. The interior surface of the top panel 3 is located adjacent to the canopy 33.

The shading device 1 includes at least four canopy straps 5, 7, 9, and 11. The canopy straps 5, 7, 9, and 11 are adapted to releasably attach the shading device 1 to the stroller 31. Each canopy strap 5, 7, 9, and 11 has an attached end 37, a free end 39, and a length from the attached end 37 to the free end 39. The attached end 37 of each canopy strap 5, 7, 9, and 11 is attached to the shading device 1 proximate to the top panel 3. The canopy straps are preferably attached by stitching to the interior surface of the top panel 3, as shown in FIG. 1.

The free end 39 of each canopy strap has a canopy strap fastener 41. Each canopy strap fastener 41 is composed of a portion of hook and loop fastener.

Preferably the canopy straps include at least two front canopy straps 5 and 7, and at least two rear canopy straps 9 and 11. The front canopy straps 5 and 7 are located proximate to the front end 19 of the top panel 3. The canopy strap fasteners 41 of the front canopy straps 5 and 7 preferably are composed of mating portions of hook and loop fastener, and mate together to releasably attach the front end 19 of the top panel 3 to the canopy 33. The rear canopy straps 9 and 11 are located proximate to the rear end 21 of the top panel 3. The canopy strap fasteners 41 of the rear canopy straps 9 and 11 are preferably composed of mating portions of hook and loop fastener, and mate together to releasably attach the rear end 21 of the top panel 3 to the stroller 31.

Preferably each attached end 37 of each canopy strap 5, 7, 9 and 11 is attached to the interior surface of the top panel 3. Preferably each attached end 37 of each canopy strap includes a strap portion 38. Preferably each canopy strap portion 38 is composed of elastic material. Preferably the unstretched length of each canopy strap is about 8 inches, and each canopy strap can stretch to at least 11 inches. The long strap length and the elastic material makes the shading device 1 adaptable to a wide variety of stroller sizes and designs. The elastic material also makes a greater variety of configurations possible.

The rear canopy straps 9 and 11 may loop around the frame of the stroller 31, as shown in FIG. 1, or may mate together beneath the rear end of the canopy 33. The front canopy straps 5 and 7 mate together beneath the front end of the canopy 33. The strap arrangement is simple and easy to attach to the canopy 33, and holds the shading device 1 firmly on the canopy 33. The attachment is secure even in windy conditions. The shading device 1 cannot be pulled off by a child seated in the stroller 31. The shading device 1 eliminates the need to supplement a canopy 33 by draping blankets.

The shading device 1 includes a first side flap 13 and a second side flap 15. Each side flap 13 and 15 is composed of fabric. Preferably each side flap 13 and 15 is generally rectangular. Each side flap 13 and 15 has a top end 43, a bottom end 45, and a length from the top end 43 to the bottom end 45. Each side flap 13 and 15 has a width. Each side flap 13 and 15 has a front edge 47, a lowered position, and at least one raised position. In the lowered position the side flaps 13 and 15 extend downward from the top panel 3. Each side flap 13 and 15 has at least one side fastener 49. The width of each side flap 13 and 15 approximately corresponds to the length of the top panel 3. Preferably the width of the side flaps is about 13 inches.

The top end 43 of the first side flap 13 is integrally attached to the first side edge 23 of the top panel 3. The top end 43 of the second side flap 15 is integrally attached to the second side edge 25 of the top panel 3.

Each side fastener 49 is composed of a portion of hook and loop fastener. Preferably the side fasteners 49 are attached by stitching to the side flaps 13 and 15. Side fasteners 49 may be located on the exterior or interior surfaces of the side flaps 13 and 15. Side fasteners 49 may be located at the corners of the side flaps, in the center, or at other appropriate locations. Preferably at least one side fastener 49 is located proximate to the bottom end 45 of each side flap 13 and 15. The bottom end 45 of each side flap 13 and 15 is located proximate to the top panel 3 in each raised position. Each side fastener 49 is adapted to releasably secure at least one of the side flaps 13 and 15 in at least one of the raised positions.

Preferably each side flap 13 and 15 includes a side strap, 50 or 52. Each side strap 50 and 52 is located proximate to the bottom end 45 of the side flap 13 or 15. Each side strap 50 and 52 has an attached end 54, a free end 56, and a length from the attached end 54 to the free end 56. Each attached end 54 is attached to the side flap, preferably by stitching. Each free end 56 of each side strap 50 and 52 includes a side strap fastener 58. Each side strap fastener 58 is composed of a portion of hook and loop fastener. The side strap fasteners 58 preferably are composed of mating portions of hook and loop fastener, and mate together to releasably attach the side flaps 13 and 15 together in the lowered position. The side straps 50 and 52 mate together beneath the stroller seat. Alternatively, each side strap 50 or 52 may be used to attach a single side flap to the frame of the stroller 31.

Preferably each attached end 54 of each side strap 50 and 52 includes a strap portion 60. Preferably each side strap portion 60 is composed of elastic material. Preferably the unstretched length of each of the side straps is about 8 inches, and the side straps can stretch to at least 11 inches.

The shading device 1 includes a front flap 17. The front flap 17 is composed of fabric. Preferably the front flap 17 is generally rectangular. The front flap 17 has a top end 51, a bottom end 53, and a length from the top end 51 to the bottom end 53. The front flap 17 has a first side edge 55, a second side edge 57, and a width from the first side edge 55 to the second side edge 57. The front flap 17 has a lowered position and at least one raised position. In the lowered position the front flap 17 extends downward from the top panel 3.

The bottom end 53 of the front flap 17 may include a bar to help in keeping the front flap 17 straight. The bar may be hinged in the center to allow for folding.

The front flap 17 has at least one front fastener 59. The width of the front flap 17 approximately corresponds to the width of the top panel 3. Preferably the width of the front flap 17 is about 18 inches. The top end 51 of the front flap 17 is integrally attached to the front end 19 of the top panel 3. Each front fastener 59 is composed of a portion of hook and loop fastener. At least one front fastener 59 is located proximate to the bottom end 53 of the front flap 17.

The bottom end 53 of the front flap 17 is located proximate to the top panel 3 in each raised position. Each front fastener 59 is adapted to releasably secure the front flap 17 in at least one of the raised positions. The front edge 47 of the first side flap 13 in the lowered position is located proximate to the first side edge 55 of the front flap 17. The front edge 47 of the second side flap 15 in the lowered position is located proximate to the second side edge 57 of the front flap 17.

The first side flap 13 preferably includes a first front edge fastener 61. The second side flap 15 may include a second front edge fastener 63. The front flap 17 may include a first side edge fastener 65 and a second side edge fastener 67. The first front edge fastener 61 is located proximate to the front edge 47 of the first side flap 13. The second front edge fastener 63 is located proximate to the front edge 47 of the second side flap 15. The first side edge fastener 65 is located proximate to the first side edge 55 of the front flap 17. The second side edge fastener 67 is located proximate to the second side edge 57 of the front flap 17.

The first front edge fastener 61 and the first side edge fastener 65 are composed of mating portions of hook and loop fastener. The second front edge fastener 63 and the second side edge fastener 67 are composed of mating portions of hook and loop fastener. The first and second front and side edge fasteners 61, 63, 65, and 67 are adapted to releasably attach the first and second side flaps 13 and 15 to the front flap 17 in the lowered position. The fasteners may also be used in a variety of configurations. For example, the side straps 50 and 52 may be used to secure the side flaps in the fully raised position by attaching the side strap fasteners 56 to the first and second front edge fasteners 61 and 63.

The lengths of the front flap 17 and the side flaps 13 and 15 each are sufficiently long in the lowered position to protect approximately the entire body of a child seated in the stroller 31 from solar radiation. The lengths of the front and side flaps 17, 13 and 15 are sufficiently short in the lowered position to avoid interference with the wheels of the stroller 31. Preferably the length of each of the side flaps is about 17 inches and the length of the front flap is about 25 inches.

The separate side and front flaps, 13, 15, and 17, provide sun protection to essentially the entire body of a child in the stroller. The various flaps can be individually raised and lowered as needed and secured by hook and loop fastener in a variety of configurations. The flaps can block sunlight from one side without blocking the child's view in all directions. Even if the sunlight is coming from directly ahead, the front flap can be arranged for sun protection while leaving the side flaps up for the child to see out. The flaps can be easily and quickly rearranged if the direction of the sun changes.

When sun protection is not needed, the shading device 1 quickly folds completely out of the way and does not block the child's view. If desired, the shading device may also be removed from the stroller and folded to store compactly in a diaper bag or stroller cart. In some configurations, the shading device 1 can provide protection from wind when necessary.

The shading device 1 with all or most of the flaps in the lowered position provides a dark, stimulus-free enclosure for the child in the stroller. This is convenient for napping, quiet bottle feedings, or other quiet activities. A child can nap easily even in a noisy environment with people moving around, such as a restaurant or mall. A caregiver can easily lift a flap to check on the sleeping child without waking him. When the child is napping during a walk, no rearrangement of the flaps is needed to provide continual sun protection.

The shading device 1 has several other advantages over typical stroller sunshades. The shading device 1 can be used with inexpensive strollers intended to fold compactly, such as umbrella strollers. The shading device 1 can fold in any direction the stroller can fold, including side to side. The shading device 1 can be folded and stored along with the stroller, without removing it from the stroller. Being composed of fabric, elastic strapping, and hook and loop fastener, the shading device 1 is lightweight, simple and inexpensive to manufacture. The shading device 1 used with an inexpensive stroller provides sun protection which is better and more adaptable than that provided by the sunshades of expensive strollers. The shading device 1 can be easily transferred from one stroller to another, eliminating the need to buy duplicates for each stroller.

The shading device 1 may include a rain panel 69. The rain panel 69 is adapted to protect the body of the child in the stroller 31 from rain. The rain panel 69 is not intended to provide complete protection from heavy rain. The rain panel allows walks during light rain, or can provide time to reach home or a sheltered area when a rainstorm begins unexpectedly.

Preferably the rain panel 69 is composed of a single simple plastic sheet. The rain panel 69 has a top end 71 and a bottom end 73. The rain panel 69 has a lowered position, a raised position, and a rain panel strap 75. The rain panel 69 extends downward from the top panel 3 in the lowered position. The plastic sheet is generally transparent and generally rectangular.

Figure 2:
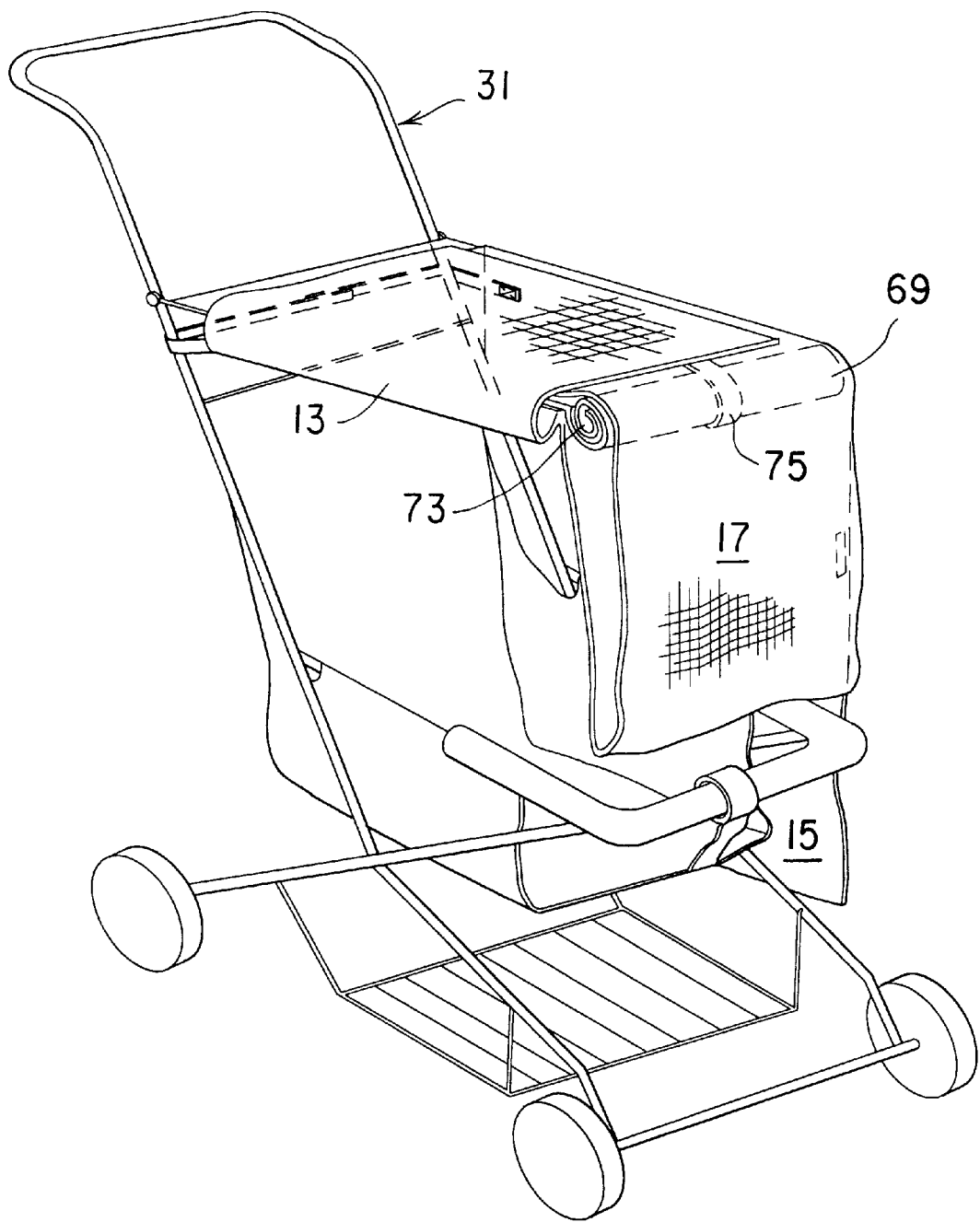
FIG. 2 is an environmental, perspective view of the stroller shading device of FIG. 1, with one side flap in the fully raised position and the front flap in the partially raised position.

The top end 71 of the rain panel 69 is attached to the top panel 3. The rain panel 69 may extend across both the front panel 17 and the top panel 3, or only the front panel 17. The rain panel strap 75 is adapted to releasably secure the rain panel 69 in the raised position. Preferably the rain panel rolls for storage in the raised position, as shown in FIG. 2. When the front flap 17 and the rain panel 69 are used together, the bottom end 73 of the rain panel 69 is located proximate to the bottom end 53 of the front flap 17 in the lowered position. The bottom end 73 of the rain panel 69 is located proximate to the top panel 3 in the raised position. The rain panel strap 75 has a free end 77. The free end 77 of the rain panel strap 75 includes a rain panel strap fastener 79. The rain panel strap fastener 79 is composed of a portion of hook and loop fastener.

Preferably the side flaps 13 and 15 and the front flap 17 each have two raised positions. The raised positions include a partially raised position and a fully raised position. FIG. 2 shows side flap 13 in the fully raised position, front flap 17 in the partially raised position, and side flap 15 in the lowered position.

The bottom end 53 of the front flap 17 is located proximate to the front end 19 of the top panel 3 in the partially raised position. The bottom end 53 of the front flap 17 is located proximate to the rear end 21 of the top panel 3 in the fully raised position.

The bottom end 45 of the first side flap 13 is located proximate to the first side edge 23 of the top panel 3 in the partially raised position. The bottom end 45 of the first side flap 13 is located proximate to the second side edge 25 of the top panel 3 in the fully raised position. The bottom end 45 of the second side flap 15 is located proximate to the second side edge 25 of the top panel 3 in the partially raised position. The bottom end 45 of the second side flap 15 is located proximate to the first side edge 23 of the top panel 3 in the fully raised position.

Figure 3:
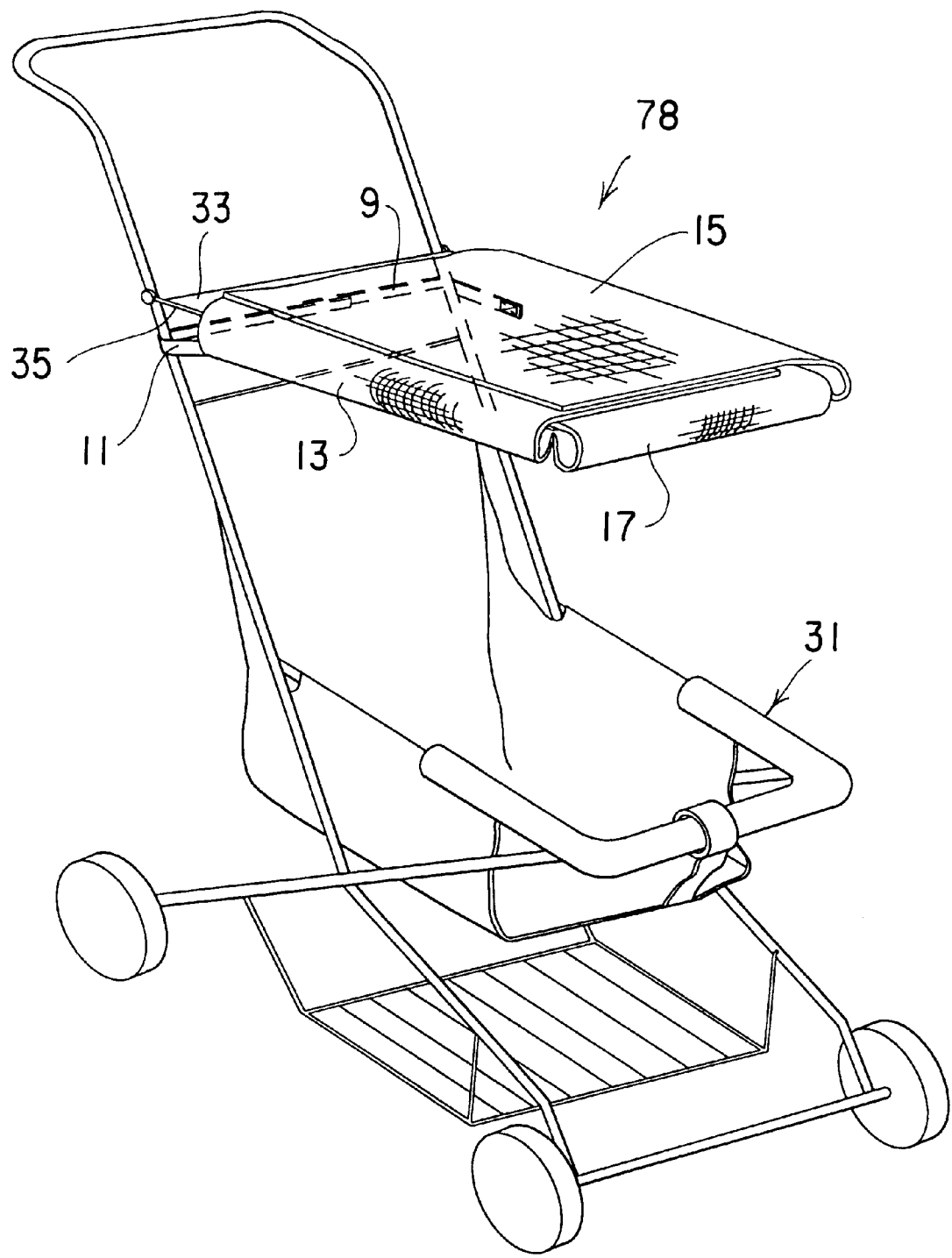
FIG. 3 is an environmental, perspective view of a stroller shading device with side and front flaps in the fully raised position.

FIG. 3 is an environmental, perspective view of an alternative embodiment 78 of a stroller shading device. The shading device 78 has no rain panel. Both side flaps 13 and 15 and the front flap 17 are in the fully raised position. The shading device 78 folds compactly out of the way when not in use.

Figure 4:
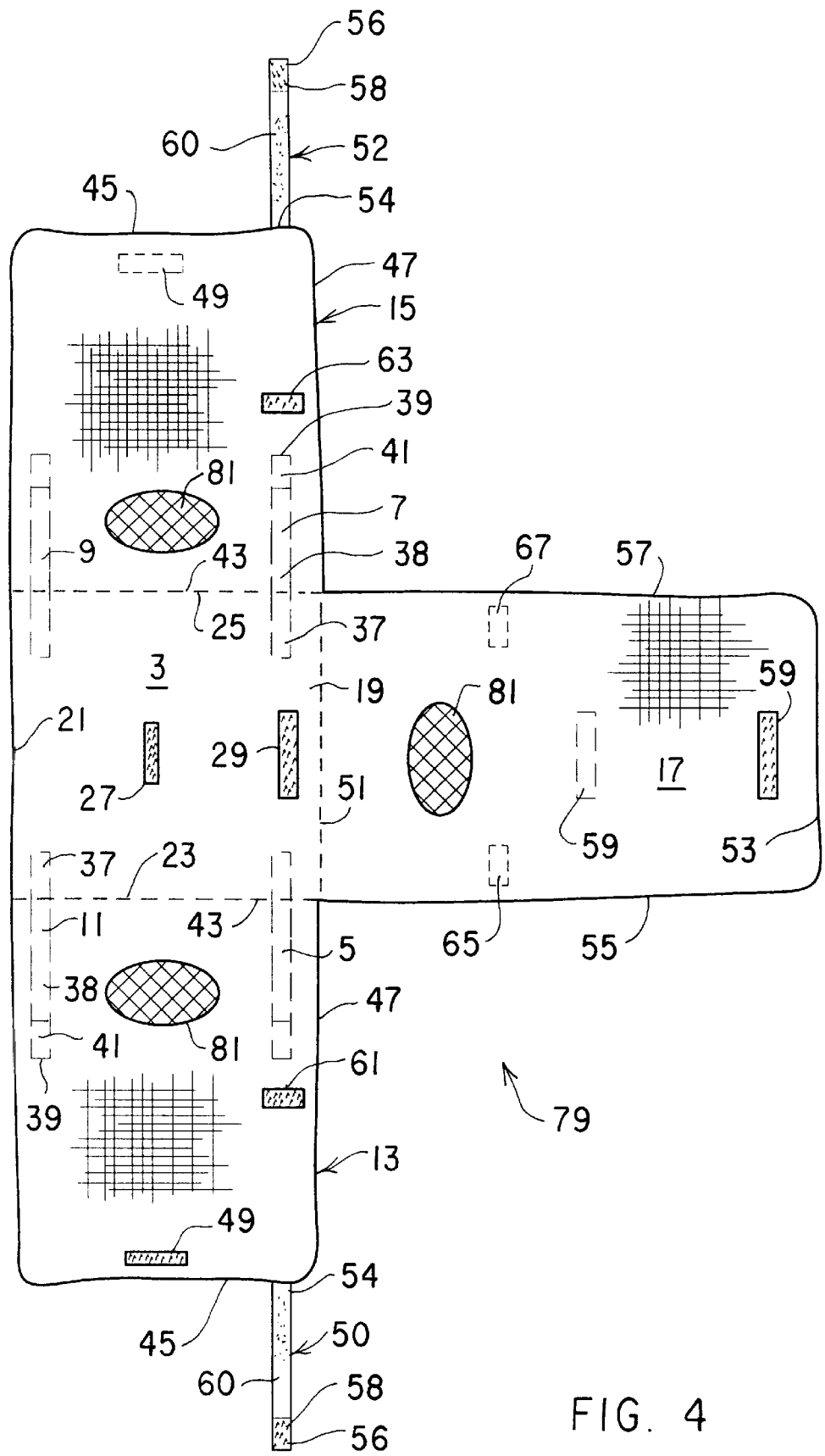
FIG. 4 is a top plan view of an unfolded stroller shading device.

FIG. 4 is a top plan view of an alternative embodiment 79 of the stroller shading device, shown unfolded and laid flat. The exterior surface of the shading device 79 is facing upward. Each of the side flaps 13 and 15 and the front flap 17 include at least one vent 81. Preferably each of the side flaps 13 and 15 and the front flap 17 include one vent 81. Each vent 81 is adapted to encourage air flow to the child in the stroller when the flap is in the lowered position. Preferably each vent 81 is generally oval and is composed of mesh netting. The vents 81 allow the child to see out even when the flaps are in the lowered position. Each vent 81 may or may not have an associated flap to cover it.

It is to be understood that the present invention is not limited to the embodiments described above, but encompasses any and all embodiments within the scope of the following claims.

I claim:

1. A shading device for a stroller, the stroller having ground contacting wheels and a canopy, the canopy having a length and a width, the shading device comprising:

(a) a top panel, the top panel being composed of fabric, the top panel being generally rectangular and having an interior surface, an opposing exterior surface, a front end, a rear end, a length from the front end to the rear end, a first side edge, a second side edge, a width from the first side edge to the second side edge, and at least two top fasteners, the length and width of the top panel approximately corresponding to the length and width of the canopy, the top panel being supported by the canopy, the interior surface of the top panel being located adjacent to the canopy, each top fastener being composed of a portion of hook and loop fastener, each top fastener being attached to the exterior surface of the top panel;

(b) at least four canopy straps, the canopy straps being adapted to releasably attach the shading device to the stroller, each canopy strap having an attached end, a free end, and a length from the attached end to the free end, the attached end of each canopy strap being attached proximate to the top panel, the free end of each canopy strap having a canopy strap fastener, each canopy strap fastener being composed of a portion of hook and loop fastener;

(c) a first side flap and a second side flap, each side flap being composed of fabric and having a top end, a bottom end, a length from the top end to the bottom end, a width, a front edge, a lowered position, at least one raised position, and at least one side fastener, the width of each side flap approximately corresponding to the length of the top panel, the top end of the first side flap being integrally attached to the first side edge of the top panel, the top end of the second side flap being integrally attached to the second side edge of the top panel, each side fastener being composed of a portion of hook and loop fastener, the bottom end of each side flap being located proximate to the top panel in each raised position, each side fastener being adapted to releasably secure at least one of the side flaps in at least one of the raised positions, each of the side flaps extending downward from the top panel in the lowered position;

(d) a front flap, the front flap being composed of fabric and having a top end, a bottom end, a length from the top end to the bottom end, a first side edge, a second side edge, a width from the first side edge to the second side edge, a lowered position, at least one raised position, and at least one front fastener, the width of the front flap approximately corresponding to the width of the top panel, the top end of the front flap being integrally attached to the front end of the top panel, each front fastener being composed of a portion of hook and loop fastener, at least one front fastener being located proximate to the bottom end of the front flap, the bottom end of the front flap being located proximate to the top panel in each raised position, each front fastener being adapted to releasably secure the front flap in at least one of the raised positions, the front flap extending downward from the top panel in the lowered position, the front edge of the first side flap in the lowered position being located proximate to the first side edge of the front flap, the front edge of the second side flap in the lowered position being located proximate to the second side edge of the front flap, the lengths of the front flap and the side flaps each being sufficiently long in the lowered position to protect approximately an entire body of a child seated in the stroller from solar radiation and sufficiently short in the lowered position to avoid interference with the wheels of the stroller.

2. The shading device according to claim 1, wherein the attached end of each of the canopy straps is attached to the top panel, and the canopy straps include at least two front canopy straps and at least two rear canopy straps, the front canopy straps being located proximate to the front end of the top panel, the canopy strap fasteners of the front canopy straps being composed of mating portions of hook and loop fastener and mating together to releasably attach the front end of the top panel to the canopy, the rear canopy straps being located proximate to the rear end of the top panel, the canopy strap fasteners of the rear canopy straps being composed of mating portions of hook and loop fastener and mating together to releasably attach the rear end of the top panel to the stroller.

3. The shading device according to claim 2, wherein the front flap and each side flap are generally rectangular, each side flap includes at least one side fastener located proximate to the bottom end of the side flap, and each side flap includes a side strap, each side strap being located proximate to the bottom end of the side flap, each side strap having an attached end, a free end, and a length from the attached end to the free end, each attached end being attached to the side flap, each free end of each side strap including a side strap fastener, each side strap fastener being composed of a portion of hook and loop fastener, the side strap fasteners being composed of mating portions of hook and loop fastener and mating together to releasably attach the side flaps together in the lowered position.

4. The shading device according to claim 3, wherein the first side flap includes a first front edge fastener, the second side flap includes a second front edge fastener, and the front flap includes a first side edge fastener and a second side edge fastener, the first front edge fastener being located proximate to the front edge of the first side flap, the second front edge fastener being located proximate to the front edge of the second side flap, the first side edge fastener being located proximate to the first side edge of the front flap, the second side edge fastener being located proximate to the second side edge of the front flap, the first front edge fastener and the first side edge fastener being composed of mating portions of hook and loop fastener, the second front edge fastener and the second side edge fastener being composed of mating portions of hook and loop fastener, the first and second front and side edge fasteners being adapted to releasably attach the first and second side flaps to the front flap in the lowered position.

5. The shading device according to claim 3, wherein the side flaps and the front flap each have two raised positions, the raised positions being a partially raised position and a fully raised position, the bottom end of the front flap being located proximate to the front end of the top panel in the partially raised position and proximate to the rear end of the top panel in the fully raised position, the bottom end of the first side flap being located proximate to the first side edge of the top panel in the partially raised position and proximate to the second side edge of the top panel in the fully raised position, the bottom end of the second side flap being located proximate to the second side edge of the top panel in the partially raised position and proximate to the first side edge of the top panel in the fully raised position.

6. The shading device according to claim 3, wherein the fabric is composed at least partially of cotton, and the fabric has a dark color.

7. The shading device according to claim 3, further comprising a rain panel, the rain panel being adapted to protect the body of the child from rain, the rain panel being composed of plastic sheet and having a top end, a bottom end, a lowered position, a raised position, and a rain panel strap, the plastic sheet being generally transparent and generally rectangular, the top end of the rain panel being attached to the top panel, the rain panel strap being adapted to releasably secure the rain panel in the raised position, the rain panel extending downward from the top panel in the lowered position, the bottom end of the rain panel being located proximate to the top panel in the raised position, the rain panel strap having a free end, the free end of the rain panel strap including a rain panel strap fastener, the rain panel strap fastener being composed of a portion of hook and loop fastener.

8. The shading device according to claim 3, wherein each attached end of each canopy strap is attached to the interior surface of the top panel, each attached end of each canopy strap includes a strap portion, and each canopy strap portion is composed of elastic material.

9. The shading device according to claim 8, wherein each attached end of each side strap includes a strap portion, and each side strap portion is composed of elastic material.

10. The shading device according to claim 9, wherein the length of the top panel and the width of each of the side flaps is about 13 inches, the width of the top panel and the front flap is about 18 inches, the length of each of the side flaps is about 17 inches, the length of the front flap is about 25 inches, and the length of each of the canopy straps and the side straps is about 8 inches.

11. The shading device according to claim 3, wherein each of the side flaps and the front flap include at least one vent, each vent being adapted to encourage air flow to the child in the stroller.

12. The shading device according to claim 11, wherein each of the side flaps and the front flap include one vent, each vent being generally oval, each vent being composed of netting.

* * * * *